(12) United States Patent  (10) Patent No.: US 10,754,592 B2
Yamaguchi  (45) Date of Patent: Aug. 25, 2020

(54) INFORMATION PROCESSING SYSTEM AND INFORMATION PROCESSING APPARATUS

(71) Applicant: Konica Minolta, Inc., Chiyoda-ku, Tokyo (JP)

(72) Inventor: Toshinobu Yamaguchi, Ikeda (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/904,925

(22) Filed: Feb. 26, 2018

(65) Prior Publication Data

US 2018/0246684 A1  Aug. 30, 2018

(30) Foreign Application Priority Data

Feb. 28, 2017 (JP) .................................. 2017-037348

(51) Int. Cl.
*G06F 3/12* (2006.01)
*B41J 29/00* (2006.01)

(52) U.S. Cl.
CPC .......... *G06F 3/1205* (2013.01); *G06F 3/1204* (2013.01); *G06F 3/1238* (2013.01); *G06F 3/1258* (2013.01); *G06F 3/1267* (2013.01); *G06F 3/1222* (2013.01)

(58) Field of Classification Search
CPC .... G06F 3/1205; G06F 3/1238; G06F 3/1258; G03G 15/5091
See application file for complete search history.

(56) References Cited

U.S. PATENT DOCUMENTS

| 2003/0020760 A1* | 1/2003 | Takatsu | G03G 15/5016 715/810 |
| 2015/0160903 A1* | 6/2015 | Mihira | G06F 3/1257 358/1.6 |
| 2017/0153587 A1* | 6/2017 | Kasahara | G03G 15/5016 |

FOREIGN PATENT DOCUMENTS

JP  2010-170234 A  8/2010

* cited by examiner

*Primary Examiner* — David M. Gray
*Assistant Examiner* — Michael A Harrison
(74) *Attorney, Agent, or Firm* — Buchanan Ingersoll & Rooney PC (57) ABSTRACT

An information processing system includes a first communication interface, an information processing apparatus which obtains job data through the first communication interface, and an image processing apparatus which executes a print job defined by the job data. The job data includes print data which defines an image and setting data which defines setting for the print job. The information processing apparatus includes a processor which performs specific processing in accordance with the setting and modifies contents of setting for the setting data of the job data so as to cancel the setting corresponding to the performed specific processing and a second communication interface which transfers the modified job data to the image processing apparatus.

17 Claims, 12 Drawing Sheets

INFORMATION PROCESSING SYSTEM AND INFORMATION PROCESSING APPARATUS

The entire disclosure of Japanese Patent Application No. 2017-037348 filed on Feb. 28, 2017 is incorporated herein by reference in its entirety.

BACKGROUND

Technological Field

The present disclosure relates to an information processing system and an information processing apparatus and particularly to an information processing system including an information processing apparatus which shares a communication interface with an image forming apparatus and an information processing apparatus included in the information processing system.

Description of the Related Art

An information processing system including a print server has conventionally been proposed. For example, Japanese Laid-Open Patent Publication No. 2010-170234 discloses an image forming system including a multi-functional machine such as a multi-functional peripheral (MFP) and a server apparatus.

In the image forming system, the server apparatus receives image output data and stores the image output data in association with destination user identification information or destination user group identification information. When the server apparatus receives user authentication information input to a multi-functional machine 3, it determines whether or not the user authentication information is authentic. When the server apparatus determines that the user authentication information is authentic, it transmits to the multi-functional machine, image output data associated with the user identification information included in the user authentication information or image output data associated with the user group identification information of a user group to which the user identified by the user authentication information belongs, of image output data.

In the information processing system as above, a communication interface may be shared between the server apparatus and an image processing apparatus. In such a case, service which has not conventionally been provided by the image processing apparatus can be provided, whereas an inconvenience which has conventionally been unexpected may be caused. Examples of such a possible inconvenience include redundant execution in the server apparatus and the image processing apparatus, of a function known as security print (a function which requires permission by a user for forming an image) or a stamp function.

Under the circumstances, a technique for avoiding an inconvenience which may be caused when a communication interface is shared between the server apparatus and the image processing apparatus is required.

SUMMARY

To achieve at least one of the abovementioned objects, according to an aspect of the present invention, an information processing system reflecting one aspect of the present invention comprises a first communication interface, an information processing apparatus which obtains job data through the first communication interface, and an image processing apparatus which executes a print job defined by the job data. The job data includes print data which defines an image and setting data which defines setting for the print job. The information processing apparatus includes a processor which performs specific processing in accordance with the setting and modifies contents of the setting for the setting data of the job data so as to cancel the setting corresponding to the performed specific processing and a second communication interface which transfers the modified job data to the image processing apparatus.

According to another aspect of the present invention, an information processing apparatus reflecting one aspect of the present invention comprises a first communication interface and a processor configured to obtain job data through the first communication interface. The job data includes print data which defines an image and setting data which defines setting for a print job defined by the job data. The information processing apparatus is configured to perform specific processing in accordance with the setting and modify the setting data of the job data so as to cancel the setting and to transfer the modified job data to an image processing apparatus configured to execute the print job.

According to yet another aspect of the present invention, a non-transitory recording medium having a computer executable program stored thereon reflecting one aspect of the present invention is provided. The program causes the computer to perform obtaining job data including print data which defines an image and setting data corresponding to setting for a print job through a communication interface, performing specific processing in accordance with the setting, modifying the setting data of the job data so as to cancel the setting, and transferring the modified job data to an image processing apparatus which executes the print job.

According to yet another aspect of the present invention, a method performed by a computer of an information processing apparatus which can communicate with an image processing apparatus reflecting one aspect of the present invention is provided. The method comprises obtaining job data including print data which defines an image and setting data corresponding to setting for a print job through a first communication interface, performing specific processing in accordance with the setting, modifying the setting data of the job data so as to cancel the setting, and transferring the modified job data to an image processing apparatus which executes the print job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

An embodiment of an information processing system will be described below with reference to the drawings. The same elements and components in the description below have the same reference characters allotted and their labels and functions are also the same. Therefore, description thereof will not be repeated.

[1. Schematic Configuration of Network System Including Information Processing System]

Figure 1:
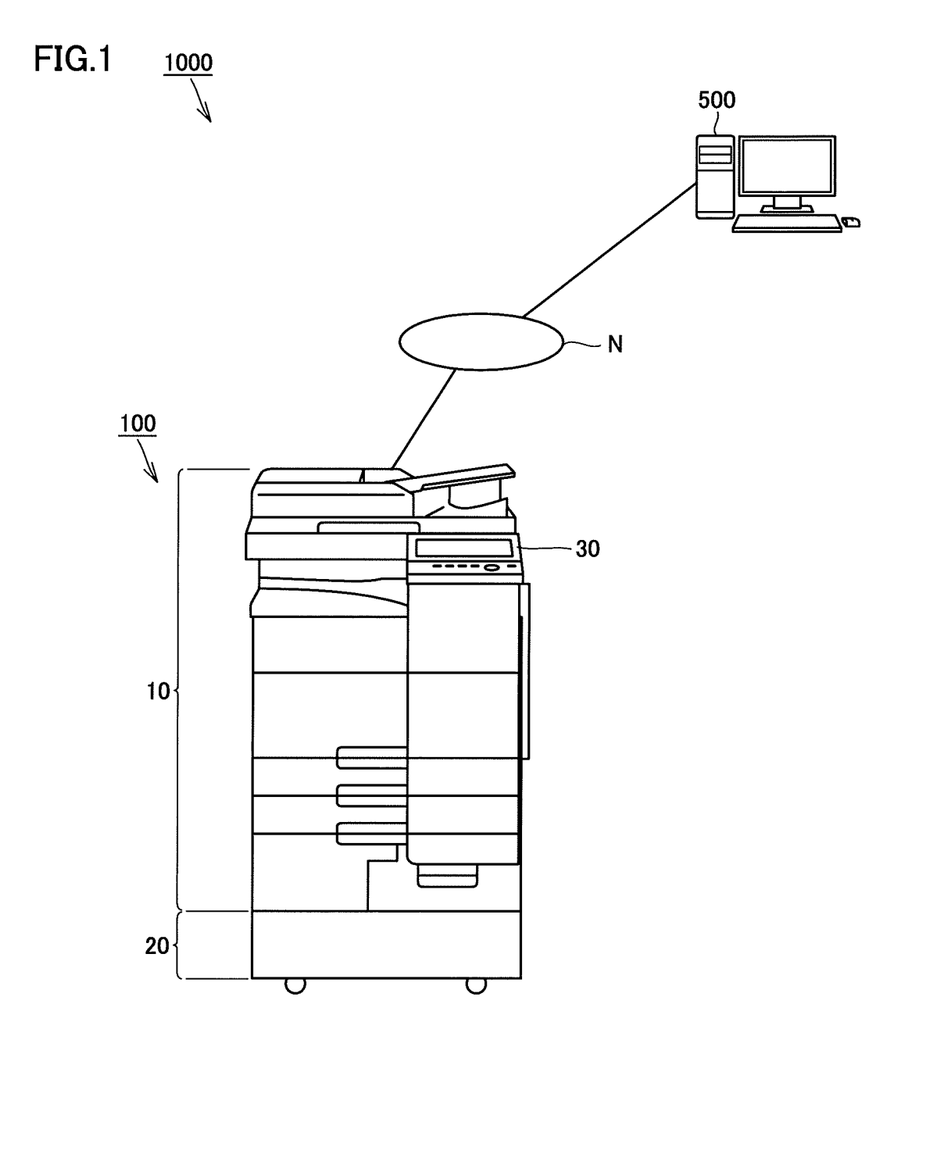
FIG. 1 is a diagram showing a schematic configuration of a network system.

FIG. 1 is a diagram showing a schematic configuration of a network system. As shown in FIG. 1, a network system 1000 includes information processing equipment 100 and an information terminal 500 which represent examples of the information processing system. Information processing equipment 100 is configured to communicate with information terminal 500, for example, through a global network.

Information processing equipment 100 is implemented as equipment, for example, in which a housing of a server and a housing of an MFP representing an image processing apparatus are coupled to each other and integrally constructed. Information processing equipment 100 includes an operation panel 30 used as a user interface of a server portion and an MFP portion thereof.

Information terminal 500 is implemented, for example, by a personal computer in which a printer driver has been installed.

[2. Hardware Configuration of Information Processing System]

Figure 2:
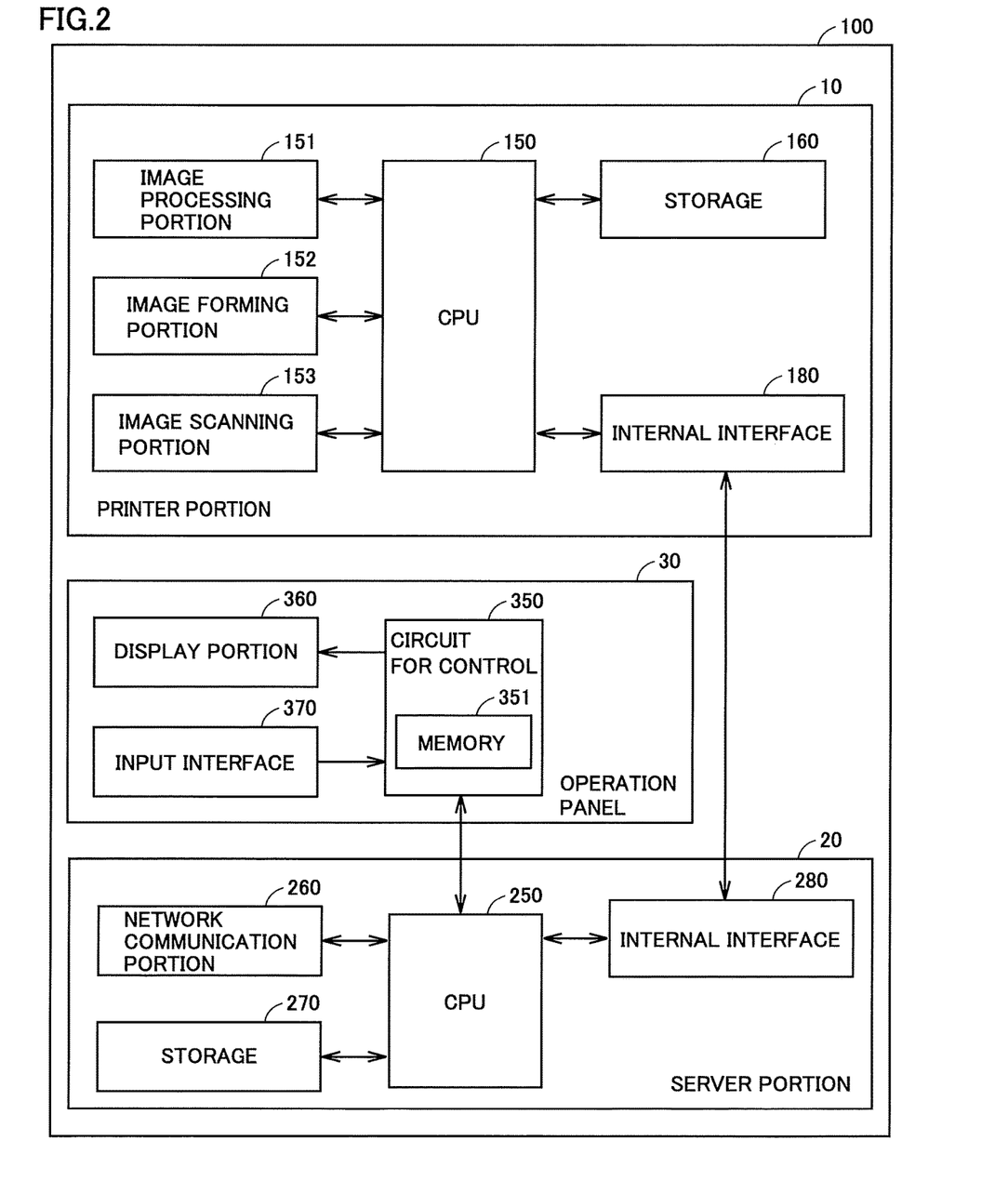
FIG. 2 is a hardware block diagram of information processing equipment 100.

FIG. 2 is a hardware block diagram of information processing equipment 100. As shown in FIG. 2, information processing equipment 100 mainly includes a printer portion 10 which functions as a printer such as an MFP and a server portion 20. A configuration of each of them will be described below.

(Printer Portion 10)

As shown in FIG. 2, printer portion 10 includes a central processing unit (CPU) 150 for overall control of printer portion 10 and a storage 160.

Storage 160 is implemented, for example, by a non-volatile memory. Information stored in storage 160 may include a program executed by CPU 150 and data used for execution of the program.

Printer portion 10 further includes an image processing portion 151, an image forming portion 152, an image scanning portion 153, and an internal interface 180.

Image processing portion 151 performs such processing as scaling of an image to be output by processing input image data. Image processing portion 151 is implemented, for example, by a processor for image processing and a memory.

Image forming portion 152 is implemented by a hardware resource for forming an image on recording paper such as a toner cartridge, a paper tray for accommodating recording paper, and a photoconductor and a hardware resource for transporting recording paper.

Image scanning portion 153 is implemented by a hardware resource configured to generate image data of a document such as a scanner.

Since functions of image processing portion 151, image forming portion 152, and image scanning portion 153 have been well known in connection with an image forming apparatus, detailed description thereof will not be repeated.

Internal interface 180 functions as a communication interface with server portion 20 and is implemented, for example, by a local area network (LAN) card.

(Server Portion 20)

As shown in FIG. 2, server portion 20 includes a CPU 250 for overall control of server portion 20, a network communication portion 260, a storage 270, and an internal interface 280.

Network communication portion 260 is implemented by a hardware resource configured to transmit and receive data to and from external equipment such as information terminal 500 through a global network. A network card represents one example of the hardware resource. CPU 250 communicates with external equipment through network communication portion 260.

Storage 270 is implemented, for example, by a non-volatile memory. Information stored in storage 270 may include a program executed by CPU 250 and data used for execution of the program.

(Control of Operation Panel 30)

CPU 250 is further configured to control operation panel 30. Operation panel 30 includes a circuit for control 350, a display portion 360 implemented by an organic EL display, and an input interface 370 implemented by a touch sensor.

Circuit for control 350 controls a representation operation by display portion 360 in accordance with a control signal from CPU 250.

Input interface 370 outputs input information to circuit for control 350. Circuit for control 350 outputs a signal in accordance with the information input through input interface 370 to CPU 250.

[3. Hardware Configuration of Information Terminal]

Figure 3:
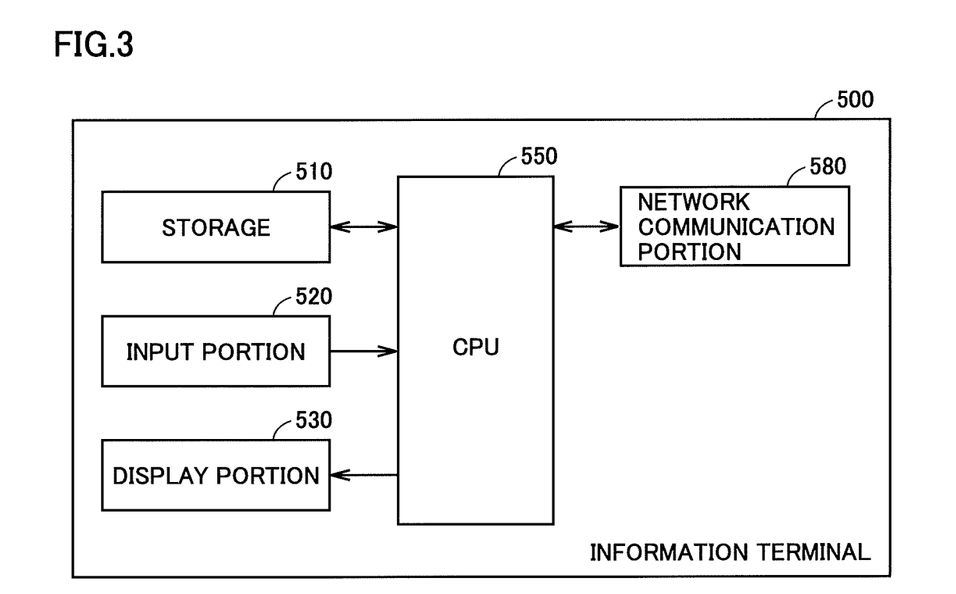
FIG. 3 is a hardware block diagram of an information terminal 500.

FIG. 3 is a hardware block diagram of information terminal 500. As shown in FIG. 3, information terminal 500 includes a CPU 550 for overall control of information terminal 500, a storage 510, an input interface 520, a display portion 530, and a network communication portion 580.

Storage 510 is implemented, for example, by a non-volatile memory. Information stored in storage 510 may include a program executed by CPU 550 and data used for execution of the program. The program includes a printer driver for generating data on a print job (job data).

Input interface 520 is implemented by an input apparatus such as a keyboard and/or a display (touch sensor) which shows a software key. Input interface 520 outputs input information to CPU 550.

Display portion 530 is implemented by a display apparatus such as a liquid crystal display. Display portion 530 shows information under the control by CPU 550.

Network communication portion 580 is implemented by a hardware resource configured to transmit and receive data to and from external equipment such as information processing equipment 100 through a global network. A network card represents one example of the hardware resource. CPU 550 communicates with external equipment through network communication portion 580.

[4. Functional Configuration of Information Processing System]

Figure 4:
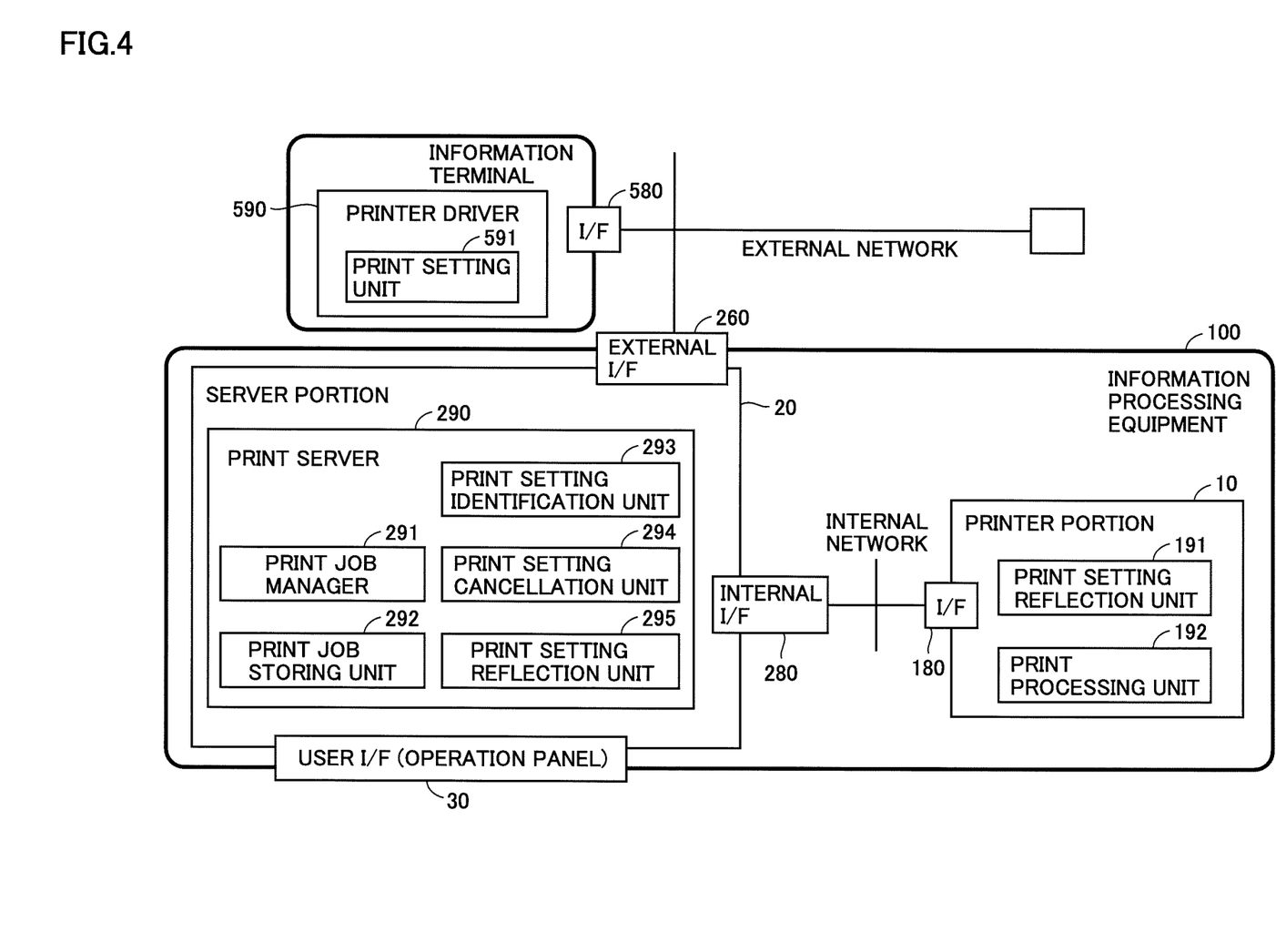
FIG. 4 is a functional block diagram of an information processing system 1000.

FIG. 4 is a functional block diagram of information processing system 1000. FIG. 4 shows a functional flock of each of information terminal 500 and information processing equipment 100.

(Information Terminal 500)

Information terminal 500 includes a printer driver 590. Printer driver 590 is implemented, for example, by execution of a program for the printer driver by CPU 550.

Printer driver 590 includes a print setting unit 591. Print setting unit 591 incorporates setting relating to printing in job data in response to designation by a user.

Setting which defines ON/OFF of security print represents one example of setting to be incorporated. When security print is ON, printing associated with job data is performed on condition that a password set in association with the job data is entered. When security print is OFF, the job data is printed without requiring entry of a password unless it is requested in another setting.

Setting which defines ON/OFF of overlay and designation of an item represents another example of setting to be incorporated. When overlay is ON, an image representing an item designated in association with overlay is printed on paper as being superimposed on an image defined by print data in printing associated with job data. A date when printing is performed represents one example of the item. A location where a file to be printed (for example, an application file which renders an image defined by print data which will be described later) is saved represents another example. A user name associated with job data represents yet another example.

(Server Portion 20)

Server portion 20 includes a print server 290. Print server 290 is implemented, for example, by CPU 250 which executes a program for the print server and storage 270.

Print server 290 includes a print job manager 291, a print job storing unit 292, a print setting identification unit 293, a print setting cancellation unit 294, and a print setting reflection unit 295.

Print job manager 291 reads print job (job data) received by network communication portion 260. The received job data is basically handled as a job which should once be held. In information processing equipment 100, the received job data is not immediately transferred to printer portion 10.

Print job storing unit 292 is implemented, for example, by storage 270 and stores job data read by print job manager 291.

Print setting identification unit 293 analyzes a print job in print job storing unit 292 in parallel to reception (reading) of a print job by print job manager 291. Print setting identification unit 293 extracts print setting to be processed by print server 290 from the print job as a result of analysis, and has a random access memory (RAM) record the print setting.

Some print jobs do not include print setting to be processed by print server 290. In such a case, no print setting is extracted by print setting identification unit 293. Printing realized by such a print job is also called "normal printing."

In one embodiment, a print job (job data) is constituted of a header, print data, and a footer. Print setting as above is normally stored in the "header". Therefore, print setting identification unit 293 may be configured to analyze print setting only in connection with the header of each piece of job data. When analysis of the header is completed, analysis of the job data ends.

When print setting identification unit 293 quits analysis, it determines whether or not print setting for job data includes setting requiring holding of a print job for security print, authentication print, or the like. In normal printing, print setting identification unit 293 determines that holding is not necessary and asks print job manager 291 to cancel holding. In server portion 20, holding of the print job may be canceled at the time point of completion of analysis of the header by print setting identification unit 293. Holding of the print job can be canceled before completion of reception of the whole print job. Server portion 20 can thus transfer job data to printer portion 10 while it receives a print job from a client computer (such as information terminal 500) and can minimize delay in print processing.

Print setting reflection unit 295 performs processing in accordance with print setting in a print job. Request for entry of a password for security printing (print setting) represents one example of processing in accordance with print setting. Addition of an image of a date for overlay (print setting) of a date to print data represents another example. In this case, print setting reflection unit 295 modifies print data so as to add an image showing a date.

Print setting cancellation unit 294 modifies a print job so as to cancel print setting corresponding to processing performed by print setting reflection unit 295.

As set forth above, when a print job includes print setting to be processed by server portion 20 (print server 290), server portion 20 performs processing in accordance with the print setting (print setting reflection unit 295), and after it modifies the print job so as to cancel the print setting (print setting cancellation unit 294), it transfers the print job to printer portion 10.

(Printer Portion 10)

Printer portion 10 includes a print setting reflection unit 191 and a print processing unit 192.

Print setting reflection unit 191 is implemented, for example, by image processing portion 151 and/or CPU 150. When print setting reflection unit 191 receives a print job, it has print setting reflected on print data included in the print job. For example, when a print job includes print setting of "70% reduction," print setting reflection portion 101 reduces by 70% an image to be printed included in print data.

Print processing unit 192 is implemented, for example, by image forming portion 152 and performs a printing operation defined by a print job.

[5. Job Data]

Figure 5:
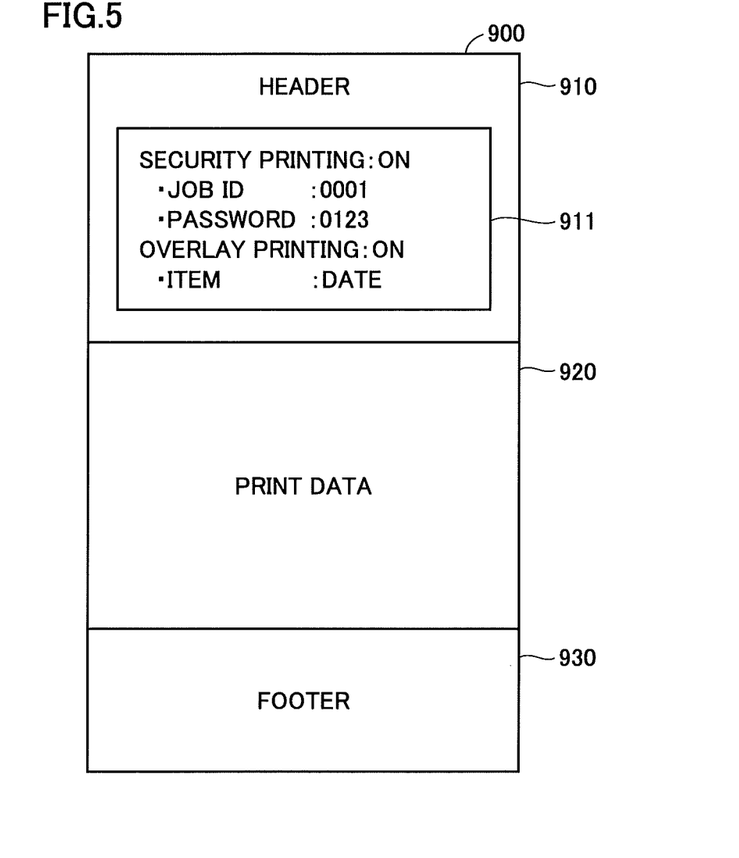
FIG. 5 is a diagram showing one example of job data.

FIG. 5 is a diagram showing one example of job data. As shown in FIG. 5, job data 900 includes a header region 910, a print data region 920, and a footer region 930.

Header region 910 includes a setting information region 911 which describes print setting information. Switch information (for example, a flag) which indicates either ON or OFF of security printing (security print) represents one example of print setting described in setting information region 911.

In the example shown in FIG. 5, information on switching of setting for security printing is set to ON which indicates execution of this processing. When the switch information is set or modified to OFF which indicates non-execution of the processing, the processing is not performed.

Setting information region 911 includes a "job ID" and a "password" as setting contents relating to security printing. The job ID specifies an individual piece of job data. The password specifies information (for example, a character string) to be input.

Information which indicates ON or OFF of overlay printing represents another example of print setting described in setting information region 911. Setting information region 911 includes an "item" as a setting content relating to overlay printing. The "item" specifies information (for example, a date) to be printed as overlay printing.

Figure 6:
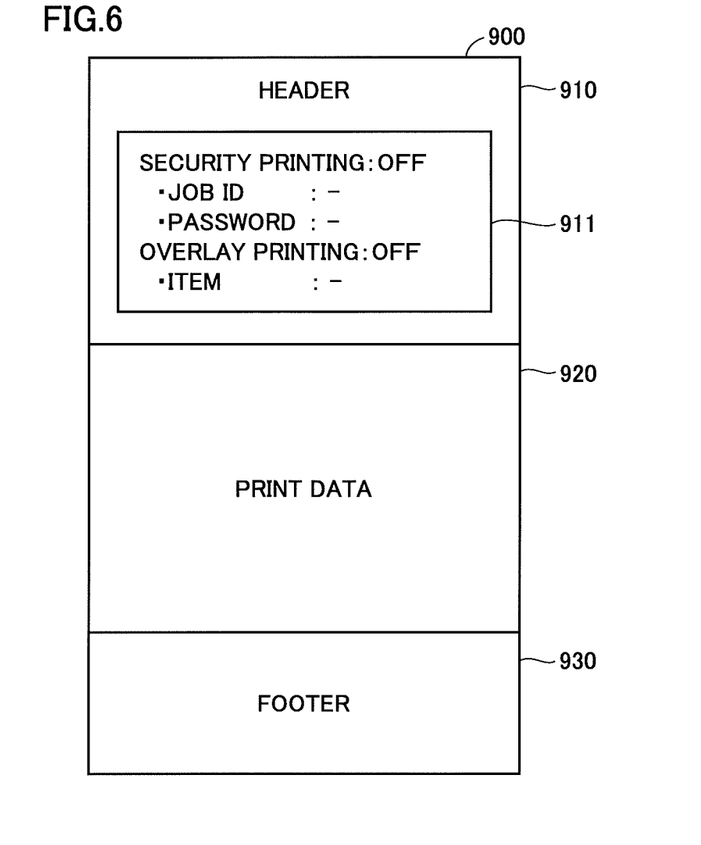
FIG. 6 is a diagram showing another example of the job data.

FIG. 6 is a diagram showing another example of the job data. In the example shown in FIG. 6, in setting information region 911, both of security printing and overlay printing are set to OFF. In job data, other than the examples shown in FIGS. 5 and 6, only any one of security printing and overlay printing may be set to ON.

[6. Flow of Process]

Figure 7:
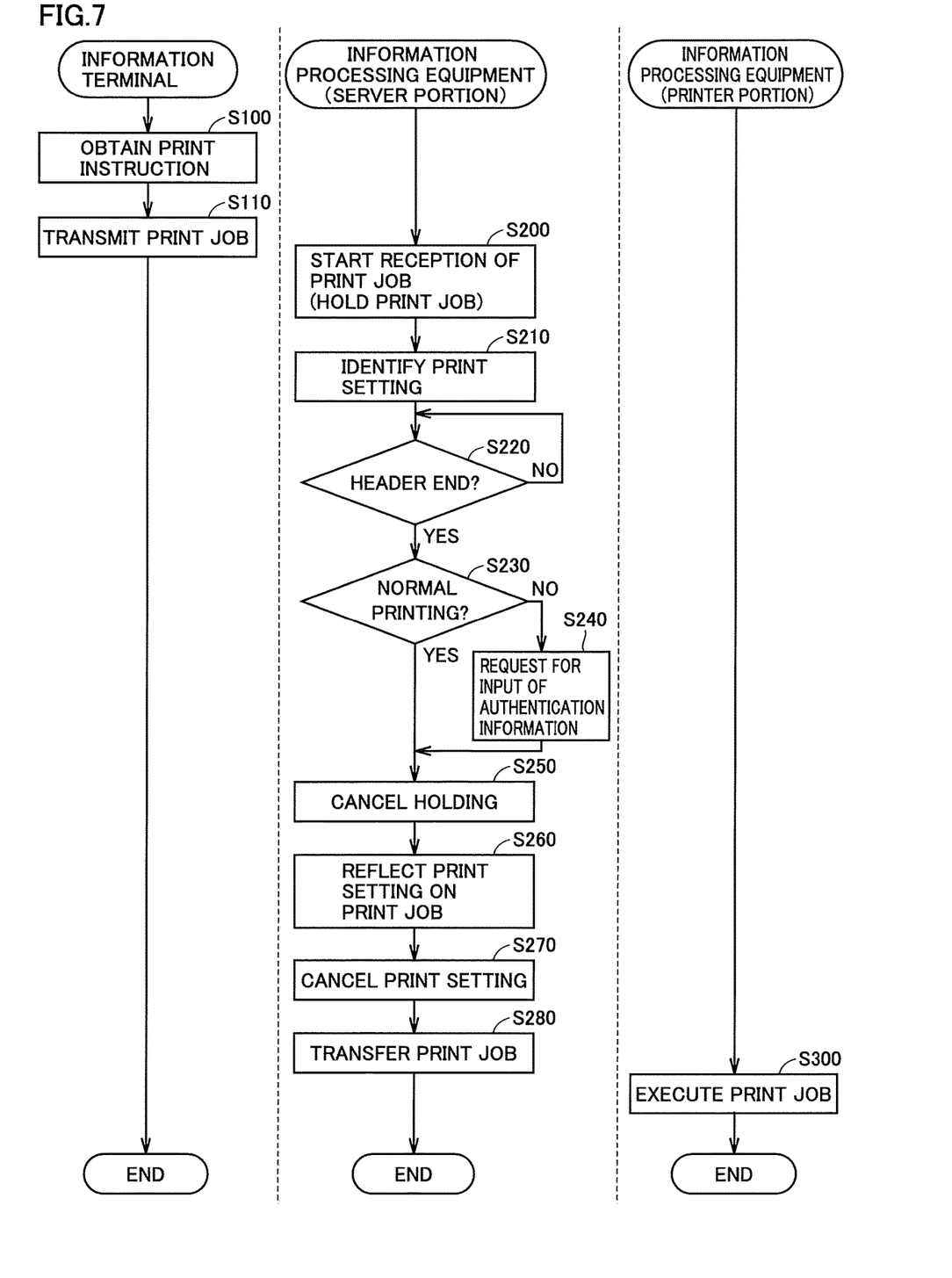
FIG. 7 is a diagram showing a flow from generation of job data by information terminal 500 until execution of a print job associated with the job data in a printer portion 10 in a network system 1000.

FIG. 7 is a diagram showing a flow from generation of job data by information terminal 500 until execution of a print job associated with the job data in printer portion 10 in network system 1000.

As shown in FIG. 7, in step S100, CPU 550 of information terminal 500 obtains a print instruction.

CPU 550 obtains a print instruction, for example, from input interface 520.

In step S110, CPU 550 generates job data in response to the print instruction and transmits the job data to information processing equipment 100.

In step S200, CPU 250 of server portion 20 of information processing equipment 100 starts reception of a print job (job data) transmitted from information terminal 500. In step S200, CPU 250 has tag information "holding" stored in association with the received job data. The tag information is information for specifying whether or not to permit transfer of the job data to printer portion 10. The tag information "holding" prohibits transfer. As the tag information "holding" is switched to tag information "cancellation of holding," transfer is permitted.

In step S210, CPU 250 identifies print setting in the received job data. More specifically, CPU 250 as print setting identification unit 293 determines whether or not the header of the job data includes print setting to be processed in server portion 20 (print server 290). In one example, when security printing is set to ON as shown in FIG. 5, CPU 250 determines that the job data includes print setting to be processed in server portion 20. In another example, when overlay printing is set to ON, CPU 250 determines that the job data includes print setting to be processed in server portion 20. In yet another example, when both of security printing and overlay printing are set to OFF, CPU 250 determines that the job data does not include print setting to be processed in server portion 20.

In step S220, CPU 250 determines whether or not analysis of the header region in the received job data has been completed. For example, when CPU 150 analyzes the job data from the beginning and determines that analysis has reached information representing completion of the header region (YES in step S220), the process proceeds to step S230.

In step S230, CPU 250 determines whether or not a print job defined by the received job data is normal printing (security printing is set to OFF). When CPU 250 determines that the print job is set to normal printing (YES in step S230), the process proceeds to step S250. When CPU 250 determines that the print job is not set to normal printing (NO in step S230), the process proceeds to step S240.

In step S240, CPU 250 requests for input of authentication information (a password for security printing). Representation of a screen which requests for entry of a password on the display portion of operation panel 30 represents one example of the request.

Figure 8:
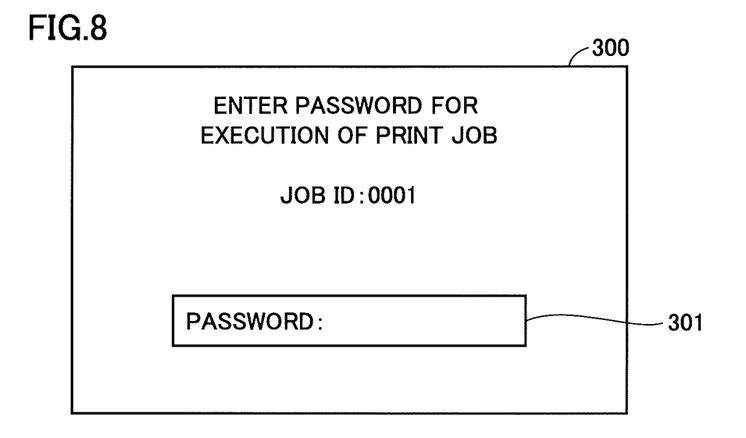
FIG. 8 is a diagram showing one example of a screen shown in step S240.

FIG. 8 is a diagram showing one example of a screen shown in step S240. As shown in FIG. 8, a password request screen 300 shows a message ("enter password for execution of print job") inviting entry of a password for execution of a print job and information (a job ID) specifying job data. Password request screen 300 further shows a password entry field 301. A user enters a password in password entry field 301. When the entered password matches with a password stored in setting information region 911, the process proceeds to step S250.

In step S250, CPU 250 switches tag information "holding" associated in step S200 with job data to tag information "cancellation of holding."

In step S260, CPU 250 has setting information other than security printing reflected on the print job, of print setting which should be processed by job data in server portion 20. Overlay represents one example of print setting to be processed by the job data in server portion 20. For example, CPU 150 processes print data region 920 of job data 900 to add an image to be printed on paper as being overlaid (an image of the "item" in setting information region 911).

Figure 9:
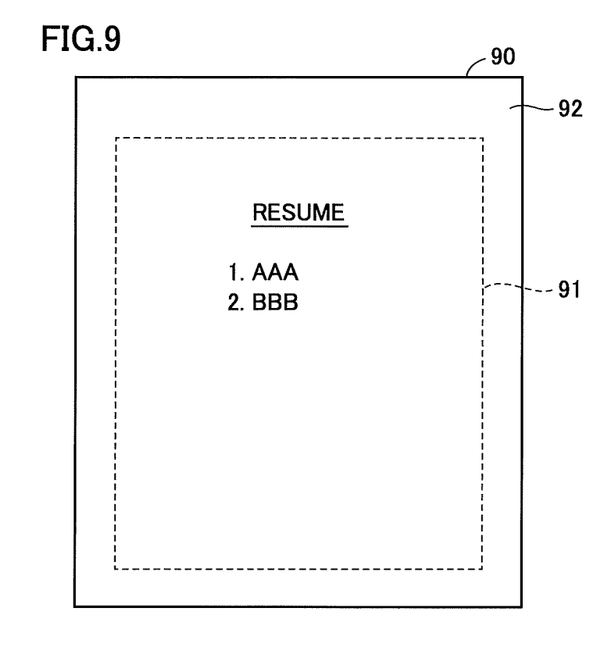
FIG. 9 shows one example of an image printed on paper in accordance with job data 900 before modification.

FIG. 9 shows one example of an image printed on paper in accordance with job data 900 before modification (print data region 920). As shown in FIG. 9, though an image is printed in a text region 91 of paper 90, nothing is printed in a page header region 92.

Figure 10:
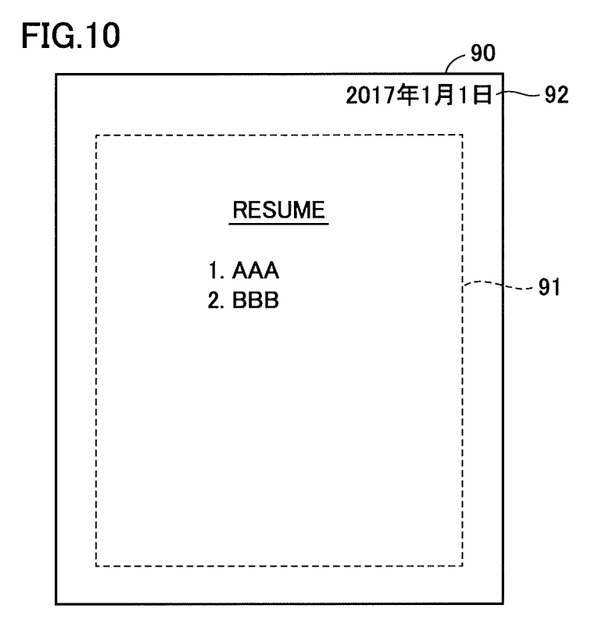
FIG. 10 shows one example of an image printed on paper in accordance with modified job data 900.

FIG. 10 shows one example of an image printed on paper in accordance with modified job data 900 (print data region 920). As compared with paper 90 in FIG. 9, paper 90 in FIG. 10 has a character string "２０１７年１月１日" added to page header region 92. The character string represents one example of an image of the "item" in setting information region 911. More specifically, the character string represents an "item" date.

Figure 11:
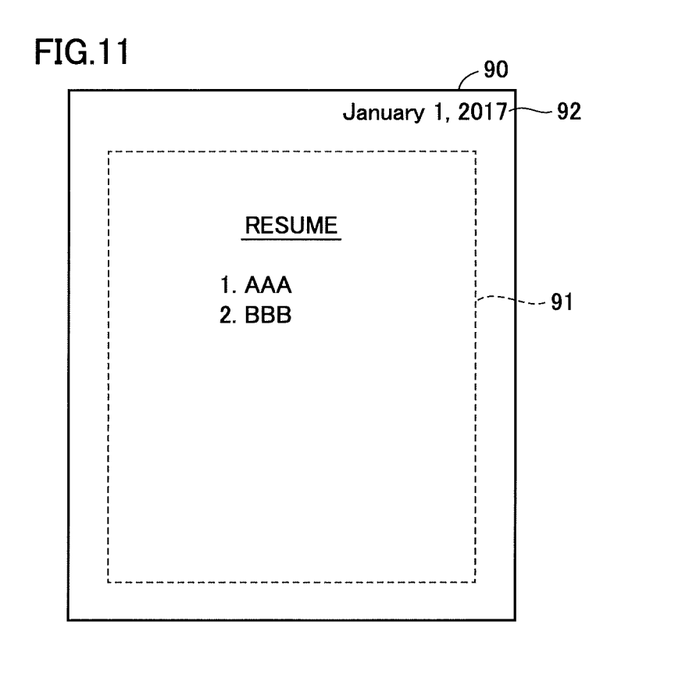
FIG. 11 shows another example of an image printed on paper in accordance with modified job data 900.

CPU 250 determines information to be added in accordance with setting in server portion 20. The setting is stored, for example, in storage 270. For example, a date to be added is a date in accordance with a time zone where server portion 20 is located. A format of a date to be added follows the setting for the format in server portion 20. When setting of the format indicates "Japanese", the character string in Chinese characters is added as shown in FIG. 10. When setting of the format indicates "English", an image of a date written in English (Jan. 1, 2017) is added as shown in FIG. 11.

Referring back to FIG. 7, in step S270, CPU 250 cancels print setting for the print job reflected on the print job in step S250. Modification to the print job represents one example of cancellation. For example, when security printing has been set to ON in a print job, modification to the job data to set security printing to OFF represents one example of cancellation. For example, when overlay printing has been set to ON in a print job, modification to job data to set overlay printing to OFF represents one example of cancellation. More specifically, modification to job data from the state shown in FIG. 5 to the state shown in FIG. 6 represents one example of cancellation.

In step S280, CPU 250 transfers processed job data to printer portion 10.

In step S300, CPU 150 of printer portion 10 executes the print job defined by the transferred job data.

[7. Modification to Configuration of Network System]

Figure 12:
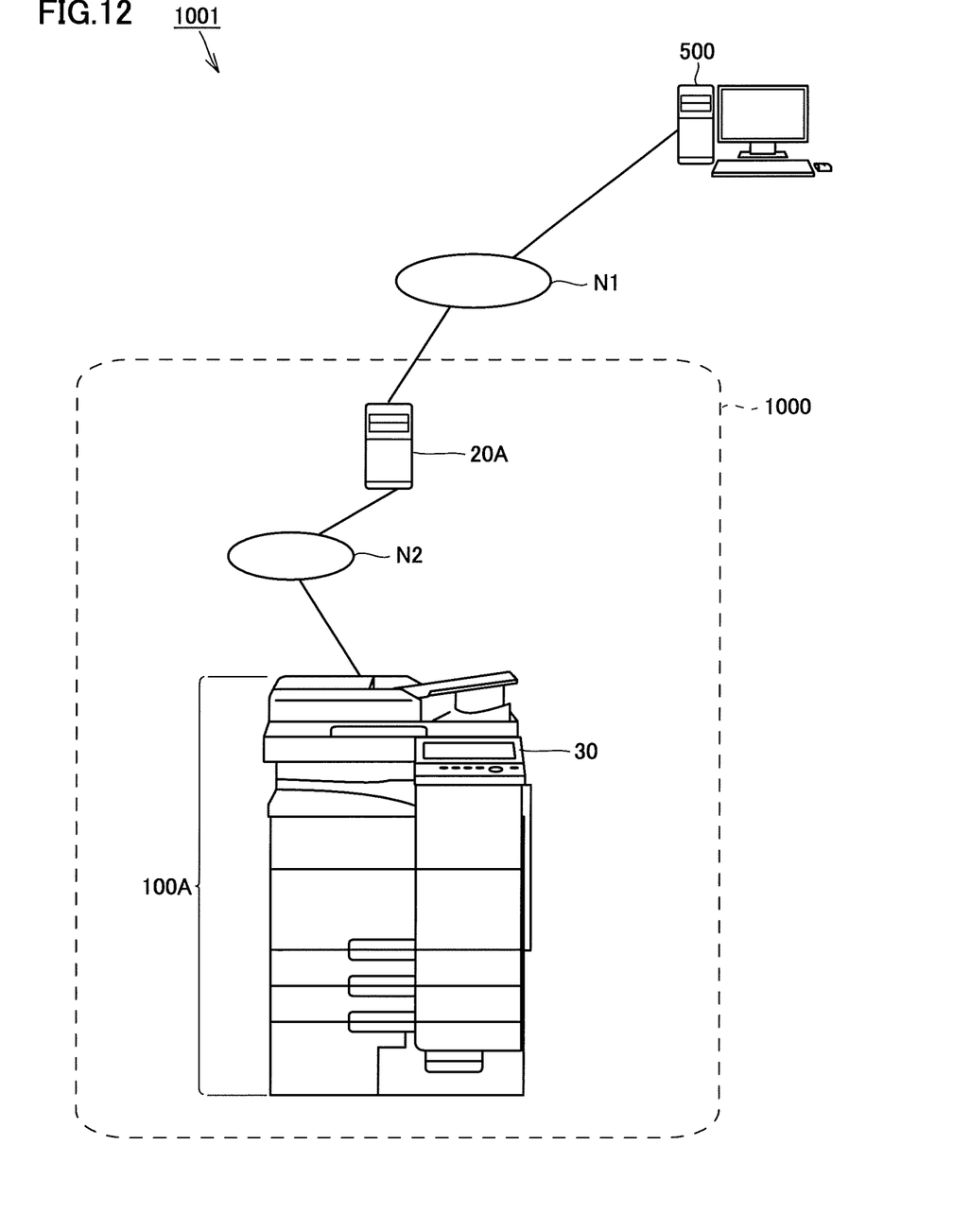
FIG. 12 is a diagram showing a configuration of a modification of a network system.

FIG. 12 is a diagram showing a configuration of a modification of a network system. In the network system, the information processing system does not have to integrally be constructed. In the network system shown in FIG. 1, information processing equipment 100 is constructed such that the housing of server portion 20 and the housing of printer portion 10 are coupled to each other. In an information processing system 1000 in a network system 1001 shown in FIG. 12, however, a server 20A and an MFP 100A are constructed separately from each other.

Server 20A represents one example of an information processing portion and is configured similarly to server portion 20 (FIG. 1). MFP 100A represents one example of a job processing portion and is configured similarly to printer portion 10 (FIG. 1). In the example in FIG. 12, server 20A and MFP 100A communicate with each other through an internal network N2 such as LAN. Server 20A and information terminal 500 communicate with each other through an external network N1 such as a global network.

[8. Summary of Disclosure]

The present disclosure described above can be summarized as below.

(1) An information processing system (information processing equipment 100) according to the present disclosure includes a communication interface (network communication portion 260), an information processing portion (CPU 250) configured to obtain job data through the communication interface, and an image processing apparatus (printer portion 10) configured to execute a print job defined by the job data. The job data (job data 900) includes print data (print data region 920) which defines an image and setting data (header region 910) which defines setting for the print job. The information processing portion is configured to perform processing in accordance with the setting (steps S240 and S260) and modify contents of the setting data described in a header of the job data so as to cancel the setting (step S270), and transfer the modified job data to the image processing apparatus (step S280).

In another aspect, an information processing system (information processing equipment 100) according to the present disclosure includes a communication interface (network communication portion 260), an information processing portion (CPU 250) configured to obtain job data through the communication interface, and an image processing apparatus (printer portion 10) configured to execute a print job defined by the job data. The job data (job data 900) includes print data (print data region 920) which defines an image and setting data (header region 910) which defines setting for the print job. The information processing portion has execution means (steps S240 and S260) for performing specific processing in accordance with the setting, modification means (step S270) for modifying contents of the setting data described in a header of the job data so as to cancel the setting corresponding to the specific processing performed by the execution means, and a second communication interface (step S280) which transfers the modified job data to the image processing apparatus.

(2) The information processing system may further include an input interface (operation panel 30) which accepts input of information. The specific processing may include requesting for input of information corresponding to the setting relating to security print to the input interface. The information processing portion may be configured to transfer the job data to the image processing apparatus on condition that the information is input.

(3) The information processing portion may be configured to transfer the job data to the image processing apparatus when the information processing portion determines that the setting data does not include the setting relating to security print (YES in step S230) without waiting for input of the information through the input interface (cancel holding in step S250 without waiting for input of authentication information in step S240).

(4) The specific processing may be overlay processing for modifying print data of the job data such that a designated image is printed as being superimposed on an image corresponding to the print data (steps S260 and S270).

(5) The image may include an image of a character string (an image in page header region 92) recorded in at least one of a header and a footer of paper in the print job.

(6) The information processing system may further include a storage device (storage 270) configured to store setting for the information processing portion. The information processing portion may be configured to determine the character string in accordance with setting for the information processing portion stored in the storage device.

It should be understood that each embodiment disclosed herein is illustrative and non-restrictive in every respect. The scope of the present invention is defined by the terms of the claims, rather than the description above, and is intended to include any modifications within the scope and meaning equivalent to the terms of the claims. The invention described in the embodiment and each modification is intended to be carried out alone or in combination to a maximum extent.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing system comprising:
   a first communication interface;
   a server device configured to obtain job data, from a terminal device, through the first communication interface, wherein said job data received from the terminal device defines a print job and includes both print data and setting data, said print data defines an image and said setting data defines a setting for a print job; and
   a printing device including a first processor and configured to execute the print job defined by the job data obtained by the server device, from the terminal device, wherein
   the server device includes
      a second processor configured to perform specific processing in accordance with the setting and to modify the job data by modifying contents of the setting of the setting data of the obtained job data so as to cancel the setting corresponding to the performed specific processing, and
      a second communication interface configured to transfer the modified job data to the printing device for execution.

2. The information processing system according to claim 1, wherein the specific processing is processing for defining a print procedure or processing of an image defined by the print data.

3. The information processing system according to claim 1, wherein cancellation of the setting includes changing a description in switch information representing execution or non-execution of the specific processing in the setting data from execution to non-execution.

4. The information processing system according to claim 1, wherein cancellation of the setting includes deletion of a description of the setting corresponding to the specific processing in the setting data.

5. The information processing system according to claim 1, wherein the specific processing is security print processing in which printing is performed in response to input by a user of information set in association with the job data.

6. The information processing equipment system according to claim 1, the information processing system further comprising:
an input interface which accepts input of information, wherein
the specific processing includes requesting for input of information corresponding to setting relating to security print to the input interface, and
the server device transfers the job data to the printing device on condition that the information is input.

7. The information processing system according to claim 1, wherein when the server device determines that the setting data does not include setting on security print, the server device transfers the job data to the printing device without waiting for input of information from an input interface.

8. The information processing system according to claim 1, wherein the specific processing is overlay processing for modifying the print data of the job data such that a designated image is printed as being superimposed on an image corresponding to the print data.

9. The information processing system according to claim 8, wherein the image includes an image of a character string recorded in at least one of a header and a footer of paper in the print job.

10. The information processing system according to claim 9, the information processing system further comprising a storage device, wherein the server device is configured to determine the character string in accordance with setting stored in the storage device.

11. The information processing system according to claim 1, wherein the printing device is a multi-functional peripheral (MFP), and a housing of the printing device and a housing of the server device are coupled to each other and integrally constructed as information processing equipment.

12. The information processing system according to claim 1, wherein the printing device is a multi-functional peripheral (MFP), and the MFP and the server device are connected to each other through a network.

13. A server device comprising:
a first communication interface;
a second communication interface; and
a processor configured to
obtain job data, from a terminal device, through the first communication interface, wherein said job data obtained from the terminal device defines a print job and includes both print data and setting data, said print data defines an image and said setting data defines a setting for a print job,
perform specific processing in accordance with the setting,
modify the job data by modifying contents of the setting data of the obtained job data so as to cancel the setting, and
transfer, via the second communication interface, the modified job data to a printing device configured to execute the print job.

14. The server device according to claim 13, the server device being accommodated in a housing where the printing device is accommodated.

15. The server device according to claim 13, further comprising an input interface configured to accept input of information, wherein the specific processing includes requesting for input of information corresponding to setting relating to security print to the input interface, the processor is configured to transfer the job data to the printing device on condition that the information is input, and the input interface is further configured to accept input of setting for the printing device.

16. A non-transitory recording medium having a computer executable program stored thereon, the program causing a server device to:
obtain, from a terminal device, through a first communication interface, job data, wherein said job data obtained from the terminal device defines a print job and includes both print data and setting data, said print data defines an image and said setting data defines a setting for a print job;
perform specific processing in accordance with the setting;
modify the job data by modifying contents of the setting data of the job data, obtained from the terminal device, so as to cancel the setting; and
transfer, via a second communication interface, the modified job data to a printing device which executes the print job.

17. A method performed by a computer of a server device which communicates with a printing device, the method comprising:
obtaining, through a first communication interface, job data, wherein said job data received from the terminal device defines a print job and includes both print data and setting data, said print data defines an image and said setting data defines a setting for a print job;
performing specific processing in accordance with the setting;
modifying the job data by modifying contents of the setting data of the obtained job data so as to cancel the setting; and
transferring, via a second communication interface, the modified job data to the printing device which executes the print job.

* * * * *